United States Patent [19]

Nowak et al.

[11] 4,186,819
[45] Feb. 5, 1980

[54] EXHAUST SYSTEM FOR A TWO-STROKE ENGINE

[75] Inventors: Klaus F. Nowak, Uxbridge, Canada; Stephen A. Braun, Horicon, Wis.

[73] Assignee: Deere & Company, Moline, Ill.

[21] Appl. No.: 946,546

[22] Filed: Sep. 28, 1978

[51] Int. Cl.² ............................................. F01N 1/08
[52] U.S. Cl. ................................... 181/265; 181/268; 181/272; 181/275; 181/281; 60/314
[58] Field of Search ............... 181/227, 228, 240, 255, 181/265, 266, 268, 269, 272, 275, 279–282; 138/40, 44; 60/314

[56] References Cited

U.S. PATENT DOCUMENTS

| 3,354,986 | 11/1967 | Moss et al. | 181/269 |
| 3,462,947 | 8/1969 | Nowak | 181/269 |
| 3,530,649 | 9/1970 | Porsch et al. | 181/269 |
| 3,842,599 | 10/1974 | Ehlen | 181/265 |

FOREIGN PATENT DOCUMENTS 2328110 7/1977 France.

*Primary Examiner*—L. T. Hix
*Assistant Examiner*—Benjamin R. Fuller

[57] ABSTRACT

A hollow, generally conical member is provided in a cylindrical portion of a muffler shell and has a surface cooperating with the shell to compress oncoming exhaust gases, the surface being of a special curved configuration calculated for reflecting impinging gas flow in a non-linear pattern which results in the development of pressure waves that arrive at an open exhaust port of the engine at the proper time for providing efficient scavenging and/or supercharging. The generally conical member also serves as an expansion chamber and, in one embodiment thereof, an elongate tube is provided for conveying gases axially thereinto while elongate perforations are provided in the rear end wall thereof for conveying gases therefrom. In a second embodiment thereof, a plurality of radial openings are provided for conveying gases thereinto while a tube extends axially through an end wall thereof for conveying gases therefrom.

11 Claims, 5 Drawing Figures

EXHAUST SYSTEM FOR A TWO-STROKE ENGINE

BACKGROUND OF THE INVENTION

The present invention relates to tuned exhaust systems for two-stroke engines.

Two main goals of a designer of exhaust systems for two-stroke engines are to provide a design capable of ensuring that the fuel-air mixture trapped for combustion in the engine will be optimized resulting in high specific power output while minimizing exhaust noise. Other design goals are to accomplish the main two goals in a design which is compact, relatively inexpensive and versatile.

The prior art includes a variety of attempts to accomplish one or more of the aforementioned goals and examples of those attempts which most resemble applicants' exhaust system are disclosed in U.S. Pat. No. 3,462,947 issued to Nowak on Aug. 26, 1969 and French patent application Ser. No. 75 31425 filed by Bancel et al on Oct. 14, 1975 and published under No. 2,328,110 on May 13, 1977.

The patented Nowak exhaust system is a relatively compact system including an inlet pipe projecting through a first closed end of a cylindrical shell and joined to a conical section which diverges toward and terminates in spaced relationship to a reflector plate positioned against a second closed end of the shell. Disposed in spaced concentric relationship to the conical section is a conical member which converges in a direction away from the reflector plate and cooperates with the conical section to increasingly restrict the flow of gases reflected from the reflector plate. The conical member has its large end fixed in sealing relationship to the cylindrical shell to prevent gases reflected from the reflector plate from flowing directly to an outlet pipe joined to the side of the shell. A pair of annular perforated plates are fixed to the conical member at respective spaced locations between the first closed end of the shell and the outlet pipe to thereby cooperate with the first closed end, each other and the conical member to form three expansion chambers into which the gases flow on the way to the outlet pipe. One drawback associated with the patented Nowak design is that the parts thereof are not suited to be re-arranged for providing an effective and efficient exhaust system for several different sizes of engines nor is the design particularly suited for easy assembly.

The exhaust system shown in the published Bancel et al application comprises a tubular shell including an inlet at one end from which a conical portion thereof diverges, the large end of the latter being joined to a cylindrical portion of the shell. A conical reflector member is concentrically located within the cylindrical shell portion and is mounted for axial adjustment therein with its small end facing in the direction of the inlet of the shell. Thus the reflector member cooperates with the cylindrical portion of the shell to present an increasing restriction to gas flow as it passes from the small to the large end of the conical reflector member. While the Bancel et al exhaust system is relatively simple and the reflector member may be adjusted to tune the system for use with several sizes of engines, the design does not demonstrate sufficient noise damping characteristics.

SUMMARY OF THE INVENTION

According to the present invention there is provided a novel exhaust system for two-stroke engines.

An object of the invention is to provide an exhaust system, for a two-stroke engine, which operates effectively and efficiently both as a tuned exhaust system and exhaust noise dampener while being of a design that is relatively simple to assemble and easily modified, without changing parts or tooling, for use with a variety of different sizes of engines.

A more specific object of the invention is to provide an exhaust system utilizing a hollow, generally conical reflector member positioned in a cylindrical shell portion such as to reflect exhaust pulses back toward an engine exhaust outlet while at the same time serving as a silencing chamber for exhaust gases.

Still another object is to provide a generally conical reflector member, as set forth in the previous object, but in addition having a bulbous end which cooperates with a rounded closed end of the cylindrical shell portion to define another expansion chamber for exhaust gases.

Another object is to provide an exhaust system including a generally conical member which is adapted to be fixed at selected axial positions in a cylindrical shell portion as required for use with engines of various sizes.

Yet another object is to provide a generally conical reflector member having a smoothly curved profile for reflecting pulses in a non-linear fashion resulting in the creation of pressure waves, pulses, at the engine exhaust port, which are more efficient than would be the case if a regular straight profiled conical member were used.

These and other objects will become apparent from a reading of the ensuing description, together with the appended drawings.

DESCRIPTION OF THE PREFERRED EMBODIMENT

Figure 1:
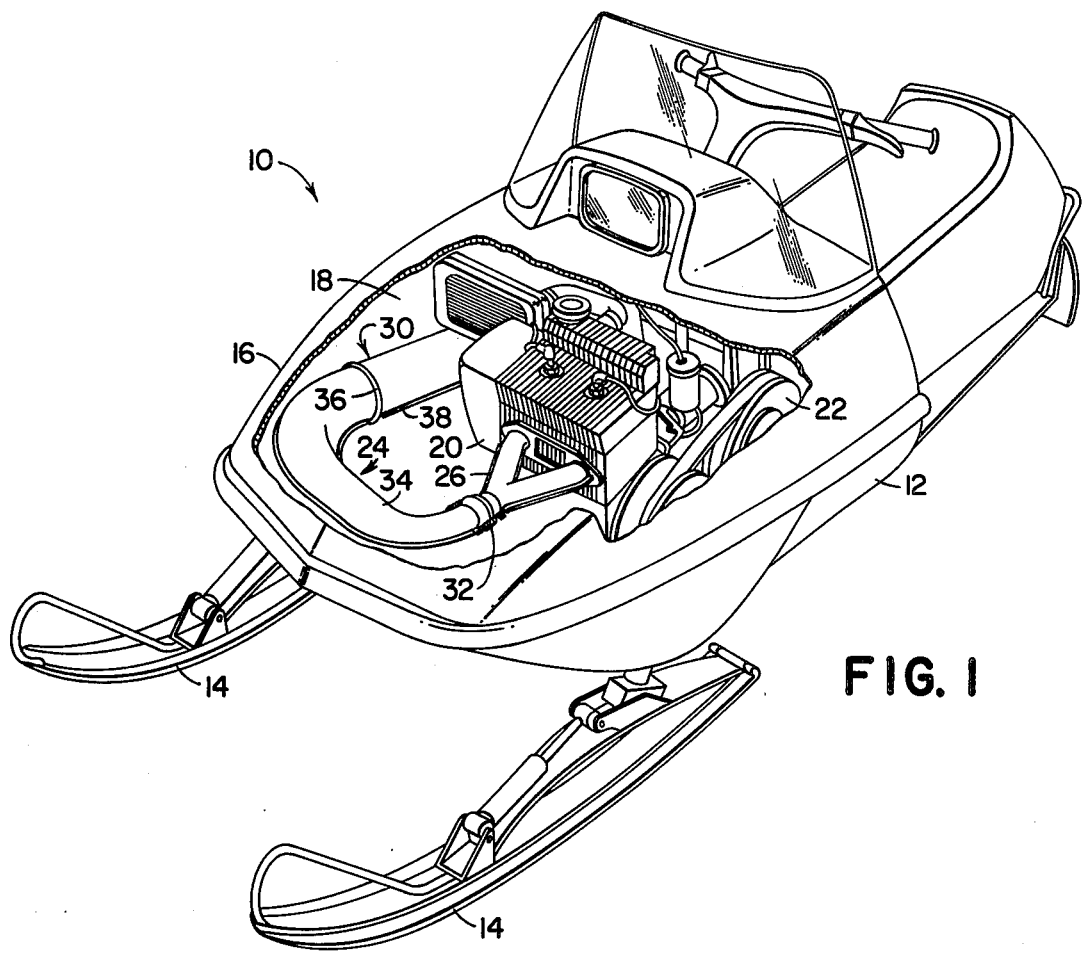
FIG. 1 is a perspective view of a snowmobile which is representative of the type of vehicle with which the present invention is particularly adapted for use.

Referring now to FIG. 1, therein is shown a snowmobile 10 including a frame 12 having its forward end supported on a pair of steerable skiis 14 and its rearward end supported on a suspended drive track (not shown). The frame 12 cooperates with a hood 16 to define a compartment 18 in which is located an engine 20 and a variable speed drive 22 coupled to the engine. The engine 20 may be of any two-stroke type but here is represented as having two cylinders and connected to receive exhaust gases from respective exhaust ports (not shown) of the engine is an exhaust system 24.

The exhaust system 24 includes a Y-pipe 26 which connects the two exhaust ports of the engine 20 to an inlet opening 28 (FIG. 2) of a tubular muffler shell 30. A pair of tension springs 32 extend between respective pairs of retainers mounted one each on the Y-pipe 26 and muffler shell 30 so as to hold the Y-pipe in gas-sealing relationship to the inlet opening 28.

Referring now to FIGS. 2–5 in addition to FIG. 1, it can be seen that the muffler shell 30, as viewed by one standing at the front of the snowmobile and looking down at the exhaust system 24, includes a generally U-shaped, conical portion 34, which diverges from the inlet opening 28 and, hence, in the direction of gas flow. The conical portion 34 extends first forwardly from the engine 20, then leftwardly and then rearwardly to a joint 36 where it joins a cylindrical portion 38 of the shell, the portion 38 being located leftwardly of the engine 20 and terminating rearwardly at a rounded closed end 40 of the shell 30. An outlet pipe 42 is joined to the cylindrical shell portion 38 at an outlet opening 44 (FIG. 4) located in the underside of the shell adjacent the end 40.

Figure 2:
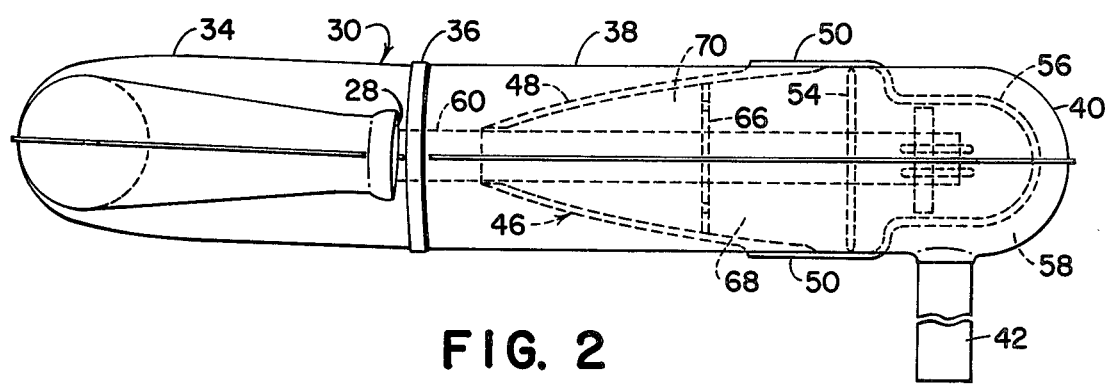
FIG. 2 is a left side view of one embodiment of the exhaust system of the present invention.
Figure 3:
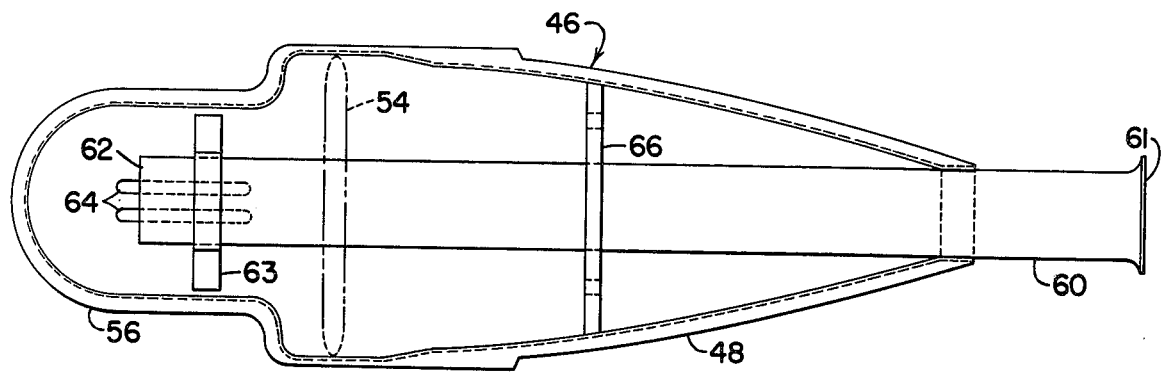
FIG. 3 is a view of the interior of one half of the generally conical reflector member shown together with the associated inlet tube of the exhaust system as it would appear at one point during assembly.
Figure 4:
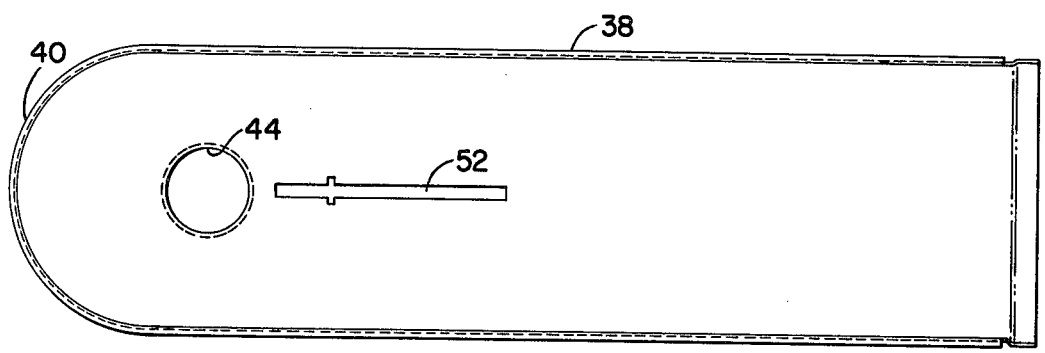
FIG. 4 is a top plan view of the lower half of the cylindrical portion of the shell of the exhaust system illustrated in FIG. 2.

A hollow, generally conical reflector member is provided in the muffler shell 30 and in accordance with a first embodiment thereof there is illustrated in FIGS. 2–4 a reflector member 46 disposed in the cylindrical portion 38 of the shell 30 with an outer surface 48 diverging in the direction of gas flow from a small end to a large end of the member 46 and having an arcuate profile designed for reflecting exhaust gas pulses back toward the exhaust ports of the engine 20 in a non-linear fashion calculated to produce back-pressure waves pulses at the exhaust port, with the waves being more efficient than could be accomplished if the member 46 were of a regular conical shape having a straight surface extending between its small and large ends. In any event, the reflector member 46 includes a pair of diametrically opposite fins 50 at its large end respectively received in a pair of locator slots 52 (only one shown in FIG. 4) provided in the cylindrical shell portion 38. The fins 50 are welded in place and extending circumferentially between the pair of fins 50 at opposite sides of the member 46 are a pair of grooves or recesses 54 adapted for receiving respective lengths of asbestos cord (not shown) for sealingly engaging the shell portion 38 to prevent gases from flowing to the outlet via a path around the member 46. The downstream end of the member 46 is defined by a bulbous extension 56 joining the large end of the member 46 and being disposed in spaced parallel relationship to the rounded closed end 40 of the shell 30 and cooperates with the end to form a chamber 58, which is in direct communication with the outlet opening 44.

A flow path from the upstream to the downstream side of the reflector member 46 is established by an elongate tube 60 which extends axially into the small end of the member 46 and has a belled inlet end 61 spaced forwardly of the member 46 and an outlet end 62 terminating within the bulbous extension 56 and supported therein by a strap 63. Provided in each of the opposite sides of the extension 56 are a pair of elongate outlet ports 64 arranged at 90° from the outlet opening 44. Located within the member 46 is a perforated baffle 66 which divides the member 46 into a pair of compartments 68 and 70. For some applications, it has been found that suitable noise dampening occurs without using the baffle 66 and it has been omitted in those cases.

The exhaust system 24 may be easily modified for use with various sizes of engines without necessitating additional tooling by either varying the length of the elongate tube 60, and/or by fixing the reflector member 46 at different axial position within the cylindrical shell portion 38.

Figure 5:
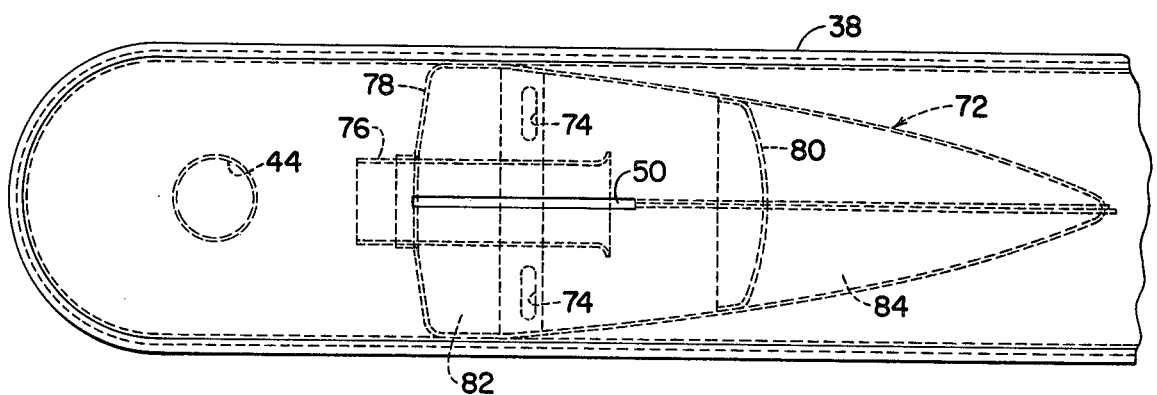
FIG. 5 is a top plan view of a portion of a second exhaust system embodiment in which the construction and mounting of the generally conical member varies from that of the generally conical member illustrated in FIG. 2.

Referring now to FIG. 5 therein is shown a second reflector member embodiment. Specifically, there is shown a reflector member 72 located in the cylindrical shell portion 38 and having its large end fixed in sealing relationship thereto in generally the same manner as the aforedescribed reflector member 46 is fixed. The member 72 differs from the member 46 in that it is provided with a plurality of inlet ports 74 located just upstream from its large end. A short tube 76 extends axially through a slightly curved closed rear end 78 of the member 72 and thus establishes a path for gas to leave the member. A perforated baffle 80 is located within the member 72 and divides the latter into first and second chambers 82 and 84, respectively.

Just as when the exhaust system 24 includes the reflector member 46, as described above, the exhaust system 24 when provided with the reflector member 72 may easily be modified for use with various sizes of engines without necessitating additional tooling. Specifically, the length of the short tube 76 may be varied and/or the member 72 may be fixed at different axial positions within the cylindrical shell portion 38.

It will be appreciated that by making the cylindrical portion 38 and the reflector members 46 and 72 of symmetrical stamped halves only one set of tooling is required for each piece and that the parts may be easily assembled. Further, it will be appreciated that the opening 44 and slots 52 are positioned in the opposite halves of the cylindrical shell portion 38 and the elongate outlet openings 64 are positioned in the one half of the reflector member 46 so as to be easily punched out during manufacture.

The operation of the exhaust system 24 is thought to be apparent from the foregoing discussion. However, it is to be noted that the system 24, when incorporating the reflector member 46, operates to damp out lower frequency noise somewhat more effectively than it does when incorporating the reflector member 72, but operates more effectively, in the latter case, to damp out high frequency noise than it does when incorporating the member 46. Thus, one may select either the reflector member 46 or the reflector member 72 in accordance with what noise frequencies he wants damped the more effective.

We claim:

1. A two-cycle engine exhaust muffler, comprising: an elongate tubular shell having inlet and outlet openings spaced from each other along the length of the shell; said shell including a first portion which increases in cross-section from a first to a second end thereof with the first end being located adjacent the inlet opening; said shell further including a second portion of substantially constant cross-section having a first end joined to the second end of the first portion; a generally conical baffle defining a hollow enclosure and being located in the shell between the inlet and outlet openings; said baffle having a large end fixed in exhaust gas sealing relationship to the second portion and having a small end located adjacent the second end of the first portion; inlet port means provided in the baffle for establishing a path for exhaust gas to flow to the interior of the baffle from the inlet opening; and outlet port means provided in the baffle establishing a path for exhaust gas to flow from the interior of the baffle to the outlet opening.

2. The muffler defined in claim 1 wherein the baffle has a curved exterior surface portion positioned for intercepting exhaust pulses emanating from the inlet opening and reflecting them back to the opening.

3. The muffler defined in claim 1 wherein the inlet port means comprises a plurality of openings spaced circumferentially about the baffle adjacent the large end thereof.

4. The muffler defined in claim 1 wherein the inlet port means comprises an elongate tube disposed along a central axis of the baffle and extending through the small end thereof.

5. The muffler defined in claim 1 wherein said baffle includes an end wall joined to the large end thereof and being adjacent the outlet opening; and said outlet port means being located in said end wall.

6. The muffler defined in claim 5, wherein said outlet port means comprises a tube extending centrally through the end wall.

7. The muffler defined in claim 3 wherein said baffle includes an end wall joined to the large end thereof and being adjacent the outlet opening; and said outlet port means being located in said end wall.

8. The muffler defined in claim 7, wherein said outlet port means comprises a tube extending centrally through the end wall.

9. The muffler defined in claim 5, wherein said end wall forms a bulbous extension of the baffle joined to said large end; and said outlet port means extending radially through the end wall.

10. The muffler defined in claim 4, wherein said end wall forms a bulbous extension of the baffle joined to said large end; and said outlet port means extending radially through the end wall.

11. The muffler defined in claim 1 wherein a perforated wall divides the interior of the baffle into two chambers.

* * * * *